United States Patent
Trail

(10) Patent No.: US 10,025,384 B1
(45) Date of Patent: Jul. 17, 2018

(54) EYE TRACKING ARCHITECTURE FOR COMMON STRUCTURED LIGHT AND TIME-OF-FLIGHT FRAMEWORK

(71) Applicant: Oculus VR, LLC, Menlo Park, CA (US)

(72) Inventor: Nicholas Daniel Trail, Bothell, WA (US)

(73) Assignee: Oculus VR, LLC, Menlo Park, CA (US)

( * ) Notice: Subject to any disclaimer, the term of this patent is extended or adjusted under 35 U.S.C. 154(b) by 63 days.

(21) Appl. No.: 15/400,256

(22) Filed: Jan. 6, 2017

(51) Int. Cl.
| | |
|---|---|
| G09G 5/00 | (2006.01) |
| G06F 3/01 | (2006.01) |
| G06T 19/00 | (2011.01) |
| H04N 5/33 | (2006.01) |
| G02B 27/01 | (2006.01) |

(52) U.S. Cl.
CPC ......... *G06F 3/013* (2013.01); *G02B 27/0172* (2013.01); *G06T 19/006* (2013.01); *H04N 5/33* (2013.01); *G02B 2027/0138* (2013.01)

(58) Field of Classification Search
None
See application file for complete search history.

(56) References Cited

U.S. PATENT DOCUMENTS

| | | |
|---|---|---|
| 2006/0210111 A1 | 9/2006 | Cleveland et al. |
| 2007/0183293 A1 | 8/2007 | Murata et al. |
| 2013/0050070 A1 | 2/2013 | Lewis et al. |
| 2013/0176533 A1 | 7/2013 | Raffle et al. |
| 2014/0153102 A1 | 6/2014 | Chang |

(Continued)

FOREIGN PATENT DOCUMENTS

| | | |
|---|---|---|
| JP | 3298081 B2 | 7/2002 |
| JP | 2014-219621 A | 11/2014 |

(Continued)

OTHER PUBLICATIONS

PCT International Search Report and Written Opinion, PCT Application No. PCT/US2016/059938, dated Dec. 20, 2016, 12 pages.

(Continued)

*Primary Examiner* — Ifedayo Iluyomade
(74) *Attorney, Agent, or Firm* — Fenwick & West LLP

(57) ABSTRACT

A head-mounted display (HMD) includes an eye tracking system that determines user's eye tracking information based on combining structured light information and time-of-flight information. The eye tracking system includes an illumination source, an imaging device and a controller. The illumination source modulates a structured light by a carrier signal and illuminates a user's eye with the modulated structured light. The imaging device includes a detector that captures the modulated structured light. The detector comprises a plurality of pixel groups, each pixel group receiving a control signal determining when a pixel group captures light, the control signal causing pixel groups to capture light at different times relative to other pixel groups. The controller determines phases of the carrier signal based on intensities of light received by different pixel groups and generates depth information related to surfaces of the user's eye, which is used to model and track the user's eye.

22 Claims, 6 Drawing Sheets

(56) References Cited

U.S. PATENT DOCUMENTS

| | | | |
|---|---|---|---|
| 2014/0211193 A1 | 7/2014 | Bloom et al. | |
| 2015/0062558 A1* | 3/2015 | Koppal | G01S 17/89 356/5.01 |
| 2015/0102981 A1 | 4/2015 | Lee et al. | |
| 2015/0181096 A1 | 6/2015 | Kasai et al. | |
| 2015/0212326 A1 | 7/2015 | Kress et al. | |
| 2016/0005179 A1 | 1/2016 | Petyushko et al. | |
| 2017/0206660 A1* | 7/2017 | Trail | G01B 11/2513 |

FOREIGN PATENT DOCUMENTS

| | | |
|---|---|---|
| KR | 10-2013-0011692 A | 1/2013 |
| KR | 10-2014-0144510 A | 12/2014 |

OTHER PUBLICATIONS

PCT International Search Report and Written Opinion, PCT Application No. PCT/US2016/017397, dated Aug. 16, 2016, 21 pages.

U.S. Appl. No. 15/407,701, filed Jan. 17, 2017, Inventors Nicholas Daniel Trail et al. [Copy Not Enclosed].

U.S. Appl. No. 14/963,126, filed Dec. 8, 2015, Inventors Douglas Robert Lanman et al. [Copy Not Enclosed].

U.S. Appl. No. 15/366,412, filed Dec. 1, 2016, Inventor Nicholas Daniel Trail. [Copy Not Enclosed].

Machine translation of JP 2014-219521, published Nov. 20, 2014, 15 pages.

PCT International Search Report and Written Opinion, PCT Application No. PCT/US2017/012346, dated Mar. 30, 2017, 13 pages.

* cited by examiner

EYE TRACKING ARCHITECTURE FOR COMMON STRUCTURED LIGHT AND TIME-OF-FLIGHT FRAMEWORK

BACKGROUND

The present disclosure generally relates to eye tracking, and specifically relates to using structured light and time-of-flight for eye tracking in virtual reality and/or augmented reality applications.

Eye tracking refers to the process of detecting the direction of a user's gaze, which may comprise detecting the angular orientation of the eye in 3-dimentional (3D) space. Eye tracking may further comprise detecting the location of the eye (e.g., the center of the eye), the torsion (i.e., the roll of the eye about the pupillary axis) of the eye, the shape of the eye, the current focal distance of the eye, the dilation of the pupil, other features of the eye's state, or some combination thereof. One known technique for eye tracking is capturing video images of a user and identifying the orientation of the user's pupils using a machine vision algorithm. However, this technique requires substantial computing resources, and is susceptible to occlusion of the eye by eyelashes and eyelids. Furthermore, this method is dependent on the contrast between the iris and the pupil, which is not invariant across users. Thus, video based pupil tracking may not be able to accurately track the eyes of certain users. In the context of a head-mounted display (HMD), such as in a virtual reality headset, this technique has additional drawbacks. The type of camera used to capture the images needed for this method of tracking may be relatively expensive or large. Similarly, this technique may place constraints on the proximity of the camera to the user's eye. Furthermore, this technique may perform poorly when the camera is located off the axis of the user's gaze. However, when eye tracking is used in an HMD, it may be preferred that the detection element of the eye tracking system be small, be close to the eye, and be off the axis of the user's gaze.

SUMMARY

Embodiments of the present disclosure support a head-mounted display (HMD) that comprises an electronic display, an optical assembly, and an eye tracking system. The HMD may be, e.g., a virtual reality (VR) system, an augmented reality (AR) system, a mixed reality (MR) system, or some combination thereof. The electronic display emits image light, and the optical assembly directs the image light to an exit pupil of the HMD corresponding to a location of a user's eye determined by the eye tracking system. The eye tracking system includes an illumination source, an imaging device (camera), and a controller that may be coupled to both the illumination source and the imaging device. The controller coupled to the illumination source modulates a structured light pattern by a temporal carrier signal so an intensity of the modulated structured light pattern varies over time based on the carrier signal. The illumination source emits the modulated structured light pattern to illuminate the user's eye. The imaging device is configured to capture the modulated structured light pattern reflected from the user's eye. The imaging device includes a detector comprising a plurality of pixel groups each including one or more pixels, each pixel group configured to receive a control signal determining when a pixel group captures light, the control signal causing pixel groups to capture light at different times relative to other pixel groups. The controller determines one or more phases of the carrier signal based on intensities of light received by different pixel groups in the detector. The controller further determines one or more times for the modulated structured light pattern to be reflected from one or more surfaces of the user's eye and captured by the detector, based on the determined one or more phases of the carrier signal. Based on both spatial data (structured light pattern) and temporal data (time-of-flight) being captured, the controller then calculates one or more distances from the detector to the one or more surfaces of the user's eye from the determined one or more times. Based on the calculated one or more distances, the controller updates a model of the user's eye and estimates a position and orientation of the user's eye based on the updated model. The image light emitted from the electronic display is rendered based on the estimated position and orientation of the user's eye.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Disclosed embodiments include an eye tracking system integrated into a head-mounted display (HMD). The HMD may be part of, e.g., a virtual reality (VR) system, an augmented reality (AR) system, a mixed reality (MR) system, or some combination thereof. The HMD may further include an electronic display and an optical assembly. The eye tracking system combines structured light and time-of-flight based methods to generate depth information used to model and track an eye of a user of the HMD. The eye tracking system includes an illumination source and an imaging device (camera). The illumination source projects on the user's eye a structured light that is temporally modulated with a known carrier signal, e.g., a carrier signal having a frequency of 10 MHz or higher. The imaging device detecting the light comprises a detector composed of an array of pixel groups that detect the modulated structured light that is reflected from at least one surface of the user's eye. Each pixel group is composed of pixels that are turned on at different times relative to other pixels in the group, allowing the imaging device to capture different phases of the reflected modulated structured light. Both structured light and time-of-flight information are captured simultaneously. The structured light and/or time-of-flight information can be used to track position and orientation of the user's eye.

Figure 1:
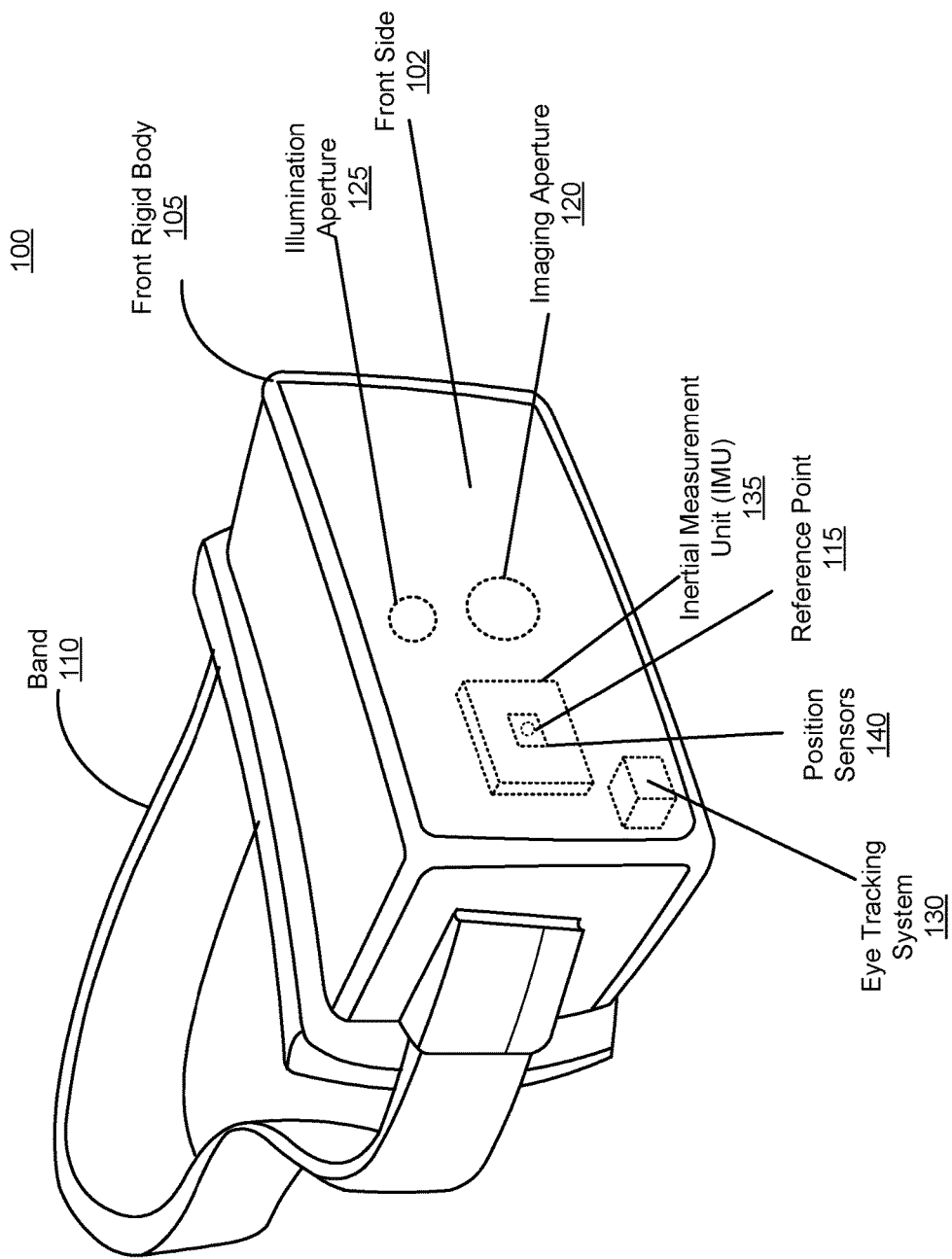
FIG. 1 is a diagram of a head-mounted display (HMD), in accordance with an embodiment.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. In some embodiments, the HMD 100 shown in FIG. 1 also includes a depth camera assembly (DCA) configured to determine depth information of a local area surrounding some or all of the HMD 100. In these embodiments, the HMD 100 would also include an imaging aperture 120 and an illumination aperture 125, and an illumination source of the DCA would emit light (e.g., structured light) through the illumination aperture 125. An imaging device of the DCA would capture light from the illumination source that is reflected/scattered from the local area through the imaging aperture 120.

In one embodiment, the front rigid body 105 includes one or more electronic display elements (not shown in FIG. 1), one or more integrated eye tracking systems 130 (e.g., one eye tracking system 130 for each eye of a user wearing the HMD 100), an Inertial Measurement Unit (IMU) 135, one or more position sensors 140, and the reference point 115. In the embodiment shown by FIG. 1, the position sensors 140 are located within the IMU 135, and neither the IMU 135 nor the position sensors 140 are visible to a user of the HMD 100. The IMU 135 is an electronic device that generates fast calibration data based on measurement signals received from one or more of the position sensors 140. A position sensor 140 generates one or more measurement signals in response to motion of the HMD 100. Examples of position sensors 140 include: one or more accelerometers, one or more gyroscopes, one or more magnetometers, another suitable type of sensor that detects motion, a type of sensor used for error correction of the IMU 135, or some combination thereof. The position sensors 140 may be located external to the IMU 135, internal to the IMU 135, or some combination thereof.

The eye tracking system 130 estimates a position and angular orientation of an eye of a user wearing the HMD 100. The position and angular orientation of the eye corresponds to the direction of the user's gaze within the HMD 100. The orientation of the user's eye is defined herein as the direction of the foveal axis, which is the axis between the fovea (an area on the retina of the eye with the highest concentration of photoreceptors) and the center of the eye's pupil. In general, when user's eyes are fixed on a point, the foveal axes of the user's eyes intersect that point. The pupillary axis is another axis of the eye which is defined as the axis passing through the center of the pupil which is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and ±4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 130 may also detect translation of the eye: i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking system 130 may also be detected. Translation of this type may occur, for example, due to shift in the position of the HMD 100 on a user's head. The eye tracking system 130 may also detect the torsion of the eye, i.e., rotation of the eye about the pupillary axis. The eye tracking system 130 may use the detected torsion of the eye to estimate the orientation of the foveal axis from the pupillary axis. The eye tracking system 130 may also track a change in the shape of the eye, which may be approximated as a skew or scaling linear transform or a twisting distortion (e.g., due to torsional deformation). The eye tracking system 130 may estimate the foveal axis based on some combination of the angular orientation of the pupillary axis, the translation of the eye, the torsion of the eye, and the current shape of the eye.

The eye tracking system 130 includes an illumination source with at least one emitter which projects a structured light pattern on all or a portion of the eye. The structured light pattern is then projected onto to the shape of the eye, which may produce a perceived distortion in the structured light pattern when viewed from an offset angle. The eye tracking system 130 also includes at least one imaging device (camera) which detects the distortions (if any) of the light pattern projected onto the eye. An imaging device, oriented on a different axis than the illumination source, captures the illumination pattern on the eye. By detecting the deformation of the illumination pattern on the surface of the eye, the eye tracking system 130 can determine the shape of the portion of the eye. The captured distorted light pattern is therefore indicative of the three-dimensional (3D) shape of the illuminated portion of the eye. By deriving the 3D shape of the portion of the eye illuminated by the illumination source, the orientation of the eye can be derived. The eye tracking system 130 can determine 3D coordinates of different surfaces of the eye, such as sclera, cornea and pupil. The sclera is the relatively opaque (usually visibly white) outer portion of the eye, which is often referred to as the "white of the eye." The cornea is the curved surface covering the iris and the pupil of the eye. The cornea is essentially transparent in the visible band (~380 nm to 750 nm) of the electromagnetic spectrum, and the near-infrared region (up to approximately 1,400 nm). The eye tracking system 130 can also estimate the pupillary axis, the translation of the eye, the torsion of the eye, and the current shape of the eye based on the image of the illumination pattern captured by the imaging device.

As the orientation may be determined for both eyes of the user, the eye tracking system 130 is able to determine where the user is looking. The HMD 100 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and though the point halfway between the pupils of the user's eyes.

The illumination source of the eye tracking system 130 is configured to project a known spatial pattern (e.g., a grid, a series of repeating or quasi-random lines, a pattern of symmetrical or quasi-randomly oriented dots, etc.) onto the eye of the user. For example, the spatial pattern comprises one or more geometrical elements of known width and height, allowing calculation of deformation of various geometrical elements when the spatial pattern is projected onto the eye to provide information about various surfaces in the eye. The illumination source of the eye tracking system 130 temporally modulates the known spatial pattern with a carrier signal having a specified frequency. In various embodiments, the illumination source of the eye tracking system 130 includes a controller (e.g., a processor) coupled to a light emitter of the illumination source, with the controller configured to modulate light emitted by the light emitter by a carrier signal to vary intensity of the light emitted by the light emitter over time based on variation of the carrier signal. When the light emitter emits a known spatial pattern (i.e., a "pattern of structured light" or a "structured light pattern"), the intensity of the known spatial pattern varies over time based on the carrier signal. For example, the illumination source of the eye tracking system 130 includes a light emitter coupled to a controller that modulates a known spatial pattern with a sine wave having a frequency of 10 MHz, with a square wave having a frequency of 100 MHz, or with any other suitable signal. The imaging device of the eye tracking system 130 captures images of the eye, which are used to calculate a depth image of the eye, as further described below in conjunction with FIG. 2, FIGS. 3A-3D and FIG. 4.

Figure 2:
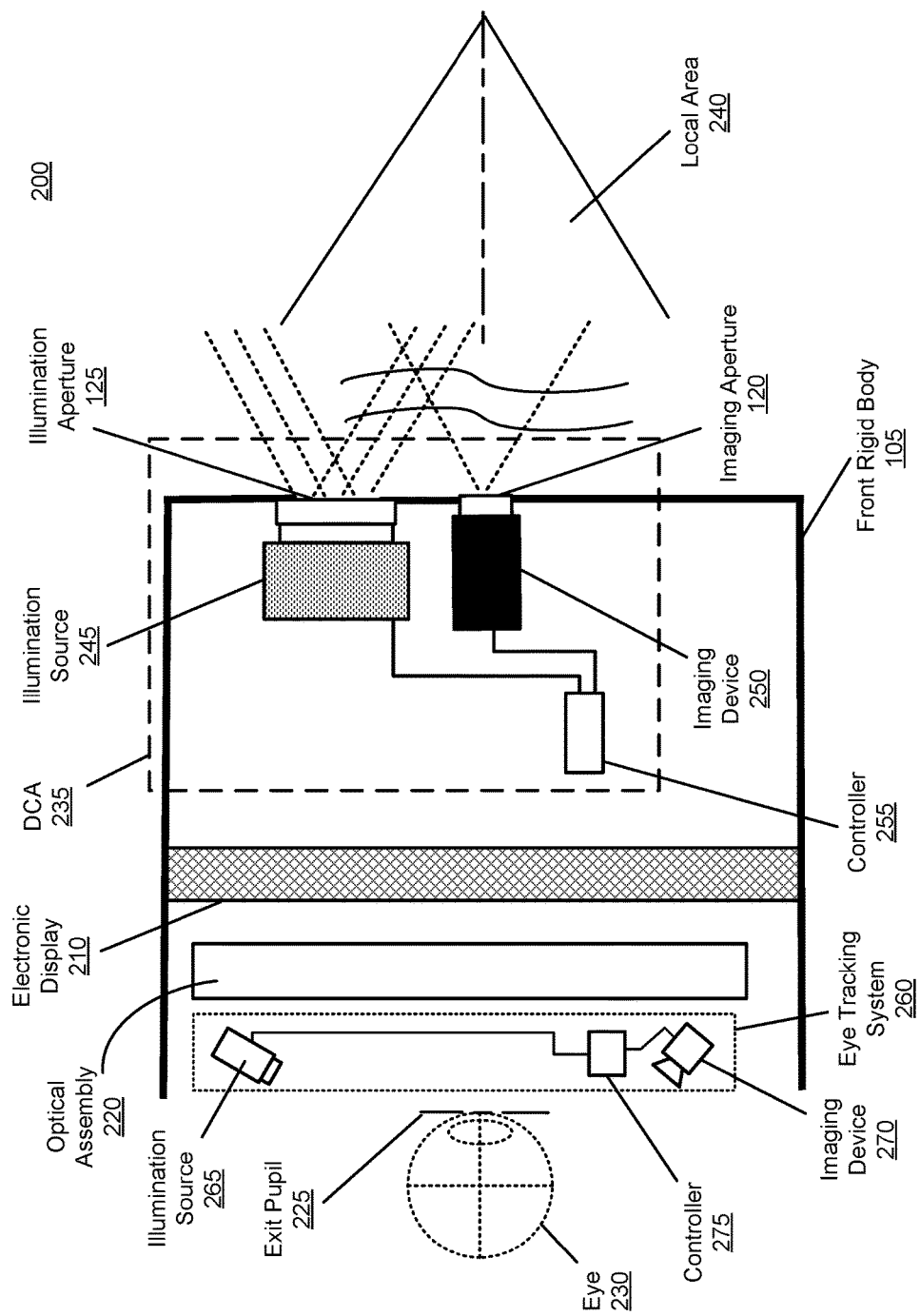
FIG. 2 is a cross section of a front rigid body of the HMD in FIG. 1 that includes an eye tracking system, in accordance with an embodiment.

FIG. 2 is a cross section 200 of the front rigid body 105 of the embodiment of the HMD 100 shown in FIG. 1. As shown in FIG. 2, the front rigid body 105 includes an electronic display 210 and an optical assembly 220 that together provide image light to an exit pupil 225. The exit pupil 225 is the location of the front rigid body 105 where a user's eye 230 is positioned. For purposes of illustration, FIG. 2 shows a cross section 200 associated with a single eye 230, but another optical assembly 220, separate from the optical assembly 220, provides altered image light to another eye of the user. The front rigid body 105 also has an optical axis corresponding to a path along which image light propagates through the front rigid body 105.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 220 magnifies received light from the electronic display 210, corrects optical aberrations associated with the image light, and the corrected image light is presented to a user of the HMD 100. At least one optical element of the optical assembly 220 may be an aperture, a Fresnel lens, a refractive lens, a reflective surface, a diffractive element, a waveguide, a filter, or any other suitable optical element that affects the image light emitted from the electronic display 210. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the electronic display 210 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical assembly 220 is designed so its effective focal length is larger than the spacing to the electronic display 210, which magnifies the image light projected by the electronic display 210. Additionally, in some embodiments, the amount of magnification may be adjusted by adding or removing optical elements.

The front rigid body 105 further includes a DCA 235 for determining depth information of one or more objects in a local area 240 surrounding some or all of the HMD 100. The DCA 235 includes an illumination source 245, an imaging device (camera) 250, and a controller 255 that may be coupled to both the illumination source 245 and the imaging device 250. The illumination source 245 emits light (e.g., structured light) through the illumination aperture 125. The illumination source 245 may be composed of a plurality of laser-type light emitters on a single substrate configured to simultaneously or in different time instants (e.g., controlled by the controller 260) emit a plurality of light beams, e.g., in the form of a structured light pattern. The imaging device 250 captures light from the illumination source 245 that is reflected/scattered from the local area 240 through the imaging aperture 120. The controller 260 may be configured to determine depth information of the one or more objects in the local area 240 based on the captured reflected/scattered light.

As shown in FIG. 2, the front rigid body 105 further includes an eye tracking system 260 placed between the user's eye 230 and the optical assembly 220 configured to determine and track a position and orientation of the user's eye 230. The eye tracking system 260 is an embodiment of the eye tracking system 130 in FIG. 1. In alternate embodiments, the eye tracking system 260 is placed between the optical assembly 220 and the electronic display 210 or within the optical assembly 220. The eye tracking system 260 includes an illumination source 265, an imaging device 270 and a controller 275 that may be coupled to both the illumination source 265 and the imaging device 270. In an alternate embodiment, different controllers are coupled to the illumination source 265 and the imaging device 270. The components of the eye tracking system 260 are positioned outside an optical axis of the front rigid body 105, i.e., the illumination source 265, the imaging device 270 and the controller 275 are positioned outside of a primary display optical path of the user's eye 230. In some embodiments, the illumination source 265 comprises a light emitter that emits light in a defined range of wavelengths. For example, the light emitter of the illumination source 265 can emit light in infrared (IR) having one or more wavelengths larger than 750 nm. In some embodiments, the imaging device 270 comprises a camera configured to capture images in the IR.

The imaging device 270 captures, using a detector, information describing times for light emitted from the illumination source 265 to be reflected from surfaces of the user's eye 230 back to the imaging device 270 as well as images of a structured light pattern projected onto the user's eye 230 by the illumination source 265. In various embodiments, the detector is included in the imaging device 270. To capture time-of-flight for light emitted from the illumination source 265, reflected from surfaces of the user's eye 230 and captured by the detector of the imaging device 270, the controller 275 modulates a structured light pattern emitted from the light emitter of the illumination source 265 with a temporal carrier signal having a specific frequency. The modulation of the structured light pattern with the temporal carrier signal causes the emitted structured light pattern to vary in intensity over time based on the carrier signal. For example, the controller 275 may modulate the structured light pattern with a 10 MHz sine wave. In another example, the controller 265 may modulate the structured light pattern with a 300 MHz square wave.

Figure 3A:
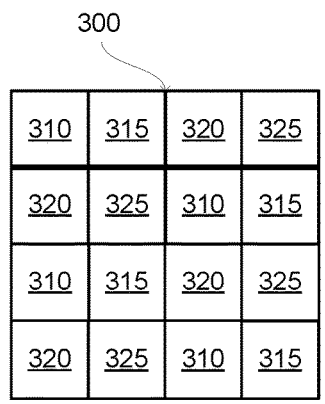
FIG. 3A is an example of a detector included in an imaging device of an eye tracking system included in the HMD in FIG. 1, in accordance with an embodiment.

To capture both the spatial and temporal modulated light pattern, the imaging device 270 includes a detector comprising multiple groups of pixels. FIG. 3A shows an example detector 300 included in the imaging device 270. The detector 300 in FIG. 3A includes different pixel groups 310, 315, 320, 325 that each receive different control signals activating the pixel groups 310, 315, 320, 325 to capture image data. Having different pixel groups 310, 315, 320, 325 receive different control signals allows the different pixel groups 310, 315, 320, 325 to capture image data with offset, yet controlled, timing sequences. For example, when a control signal received by a pixel group 310, 315, 320, 325 has a particular value, the pixel group 310, 315, 320, 325 captures light reflected from the eye 230, and when the control signal has an alternative value, the pixel group 310, 315, 320, 325 does not capture light reflected from the eye 230. Pixel groups 310, 315, 320, 325 in the detector 300 are positioned relative to each other so that pixel groups 310, 315, 320, 325 nearest to each other capture light at different times, resulting in a specific phase shift between light captured by the pixel groups 310, 315, 320, 325 nearest to each other. In the example of FIG. 3A, pixel group 310, pixel group 315, pixel group 320, and pixel group 325 capture light at different times, so light captured by pixel group 310 has a 90 degree phase shift relative to light captured by pixel group 315, which has a 90 degree phase shift relative to pixel group 320 (and a 180 degree phase shift relative to pixel group 310). However, in other embodiments, light captured by a pixel group 310 has any suitable specific phase shift relative to light captured by other pixel groups 315, 320, 325 nearest to the pixel group 310 (e.g., a 45 degree phase shift, a 60 degree phase shift, a 180 degree phase shift, etc.). Also in the example of FIG. 3A, pixel group 325 has a 90 degree phase shift to pixel group 320 (and a 270 degree phase shift to pixel group 310). Similarly, each of pixel group 315, pixel group 320, and pixel group 325 capture light with a 90 degree phase shift relative to the other pixel groups 310, 315, 320, 325. For example, pixel group 310, pixel group 315, pixel group 320, and pixel group 325 capture light with a phase shift of 0 degrees, a phase shift of 90 degrees, a phase shift of 180 degrees, and a phase shift of 270 degrees, respectively. In various embodiments, pixel groups 310, 315, 320, 325 are arranged in the detector 300 in a repeating pattern. For example, the detector 300 includes multiple 2 by 2 grids each including pixel groups 310, 315, 320, 325 arranged relative to each other as shown in FIG. 3A.

Based on captured data from the detector 300 of the imaging device 270 and the information about relative phase shift, the controller 275 determines a phase of the carrier signal that temporally modulated pattern of structured light, as further described below. Based on the determined phase of the carrier signal, the controller 275 determines a time for the modulated pattern of structured light to be reflected by a surface of the eye 230 and captured by the detector 300 of the imaging device 270. From times determined for reflection of the pattern of structured light by different surfaces of the eye 230, the controller 275 determines distances from the detector 300 to different surfaces of the eye 230 and generates a frame including the pattern of structured light from the light captured by each pixel group 310, 315, 320, 325 in the detector 300. Based on the determined distances from the detector 300 of the imaging device 270 to the different surfaces of the eye 230, the controller 275 may calculate 3D coordinates of the eye's different surfaces. The controller 275 may further update a model of the eye 230 based on the calculated 3D coordinates and estimate a position and an orientation of the eye 230 based on the updated model. In some embodiments, the controller 275 (or some other module of the HMD 100) generates an initial model of the eye 230 or receives an initial model of the eye 230 from, e.g., a console (not shown in FIGS. 1-2) coupled to the HMD 100.

In some embodiments, a varifocal model (not shown in FIG. 2) is coupled to the controller 275 and obtains information about eye position/orientation from the controller 275. The varifocal module can be configured to perform foveated rendering of one or more images displayed on the electronic display 210 based on the estimated position/orientation of the eye 230, i.e., the user's eye-gaze. The varifocal module may provide a maximum pixel density for the electronic display 210 only in a foveal region of the user's eye-gaze, while a lower pixel resolution for the electronic display 210 can be used in other regions of the electronic display 210, thus consuming less power and saving computing cycles. In some embodiments, the varifocal module changes a focal plane at which images are presented to a user. The varifocal module can be configured to change the focal plane by adjusting a location of one or more optical elements of the optical assembly 220 and/or a location of the electronic display 210. The change of location of the one or more optical elements of the optical assembly 220 and/or the change of location of the electronic display 210 is based on the information about eye position/orientation obtained from the controller 275. Based on the information about user's eye-gaze, the controller 275 and/or the varifocal module determine where the eye 230 is accommodating. Then, based on the determined accommodation region, the varifocal module adjusts the location of the one or more optical elements of the optical assembly 220 and/or the location of the electronic display 210, providing that content is presented to the user at the appropriate focal plane. Additional details regarding HMDs with varifocal capability are discussed in U.S. application Ser. No. 14/963, 109, filed Dec. 8, 2015, and is herein incorporated by reference in its entirety.

Figure 3B:
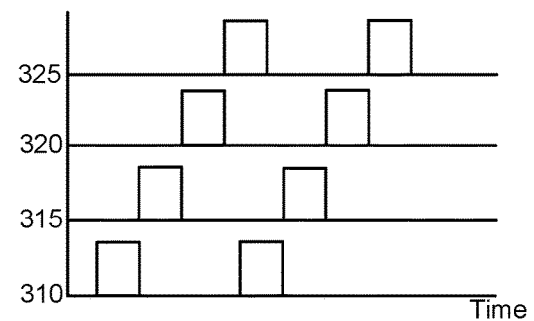
FIG. 3B is an example of control signals operating the example detector integration timing shown in FIG. 3A, in accordance with an embodiment.

FIG. 3B shows an example of control signals received, from the controller 275, by different pixel groups 310, 315, 320, 325 in the detector 300 of the imaging device 270. In the example of FIG. 3B, when a control signal has a maximum value, a pixel group 310, 315, 320, 325 receiving the control signal captures light, while pixel groups 310, 315, 320, 325 receiving different control signals do not capture light. Similarly, when the control signal has a minimum value, a pixel group 310, 315, 320, 325 receiving the control signal does not capture light. As shown by FIG. 3B, the control signals for different pixel groups 310, 315, 320, 325 have maximum values at different times, so a single pixel group 310, 315, 320, 325 captures light at a particular time. For example, when the control signal received by pixel group 315 has a maximum value, control signals received by pixel groups 310, 320, 325 have minimum values, so pixel groups 310, 320, 325 do not capture light while pixel group 315 captures light. Different pixel groups 310, 315, 320, 325 serially capture light based on their control signals. When light is captured from each pixel group 310, 315, 320, 325, the detector 300 generates a frame. In various embodiments, light is captured from each pixel group 310, 315, 320, 325 multiple times, and the detector 300 generates a frame from the accumulated light captured by the pixel groups 310, 315, 320, 325 to improve a signal-to-noise ratio of the frame. Capturing light from different pixel groups 310, 315, 320, 325 at different times is repeated for a subsequent frame, with an amount of time light is captured for a frame determined by an overall integration time for each frame and a frame rate of the imaging device 250.

Figure 3C:
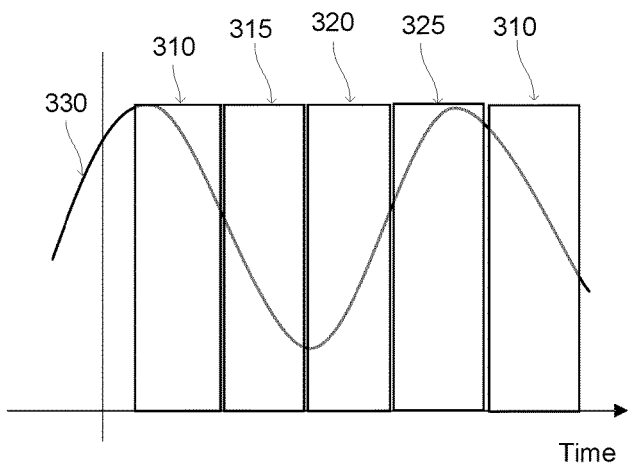
FIG. 3C is an example of capturing light by different pixel groups in the example detector shown in FIG. 3A for a sinusoidal carrier wave, in accordance with an embodiment.

Hence, in an embodiment, different pixel groups 310, 315, 320, 325 capture light reflected from at least one surface of the eye 230 at different offset times, which are a fraction of a round-trip time of a frequency of the carrier signal modulating the spatial pattern. For example, FIG. 3C shows an example sinusoidal carrier signal 330 with which the illumination source 265 modulates the structured light pattern. FIG. 3C identifies the different pixel groups 310, 315, 320, 325 capturing light including the carrier signal 330 at different times. Hence, pixel group 310 captures light including a portion of the carrier signal 330 during times when the control signal received by the pixel group 310 has a maximum value, while pixel groups 315, 320, 325 do not capture light including portions of the carrier signal 330. The remaining pixel groups 315, 320, 325 similarly each capture portions of the carrier signal 330 during time intervals when control signals received by a corresponding pixel groups 315, 320, 325 have a maximum value. While FIG. 3C shows the carrier signal 330 as a sine wave, in other embodiments, the carrier signal 330 may be a square wave or any other signal having a combination of frequencies and harmonics. Hence, in the example of FIGS. 3A-3C, when pixel group 310 captures light, the remaining pixel groups 315, 320, 325 do not capture light for that frame, so when a single pixel group is capturing light, the remaining three pixel groups do not capture light for that relative frame. After each pixel group 310, 315, 320, 325 captures light for a single serial pattern, the sequence is repeated during the integration time for a frame captured by the imaging device 270.

Based on the intensity of light received by different pixel groups 310, 315, 320, 325 in the imaging device 270, the controller 275 determines a phase of the carrier signal. For example, the controller 275 determines a difference between light captured by pixel group 325 and light captured by pixel group 315. Additionally, the controller 275 determines an additional difference between light captured by pixel group 310 and light captured by pixel group 320. In the example configuration of the detector 300 shown in FIG. 3A (which is a quadrature arrangement with a minimum of at least two measurements of the phase profile), the controller 275 determines the phase of the carrier signal as an arctangent of a ratio of the difference to the additional difference. Using the determined phase, the controller 275 determines times for light emitted from the illumination source 265 and reflected back by surfaces of the eye 230 to the detector of the imaging device 270. From the determined times, the controller 275 determines distances between the detector of the imaging device 270 and the surfaces of the eye 230 using one or more time-of-flight methods. Additionally, using the determined phase, the controller 275 combines the light captured by different pixel groups 310, 315, 320, 325 into a frame that allows the structured light pattern emitted from the illumination source 265 to provide further depth information for the eye 230. Distances determined by the one or more time-of-flight methods provide distance information between surfaces of the eye 230 and the detector of the imaging device 270, while analysis of the structured light pattern captured by the detector of the imaging device 270 provides a related but unique distance measurement between surfaces of the eye 230 and the detector of the imaging device 270.

Figure 3D:
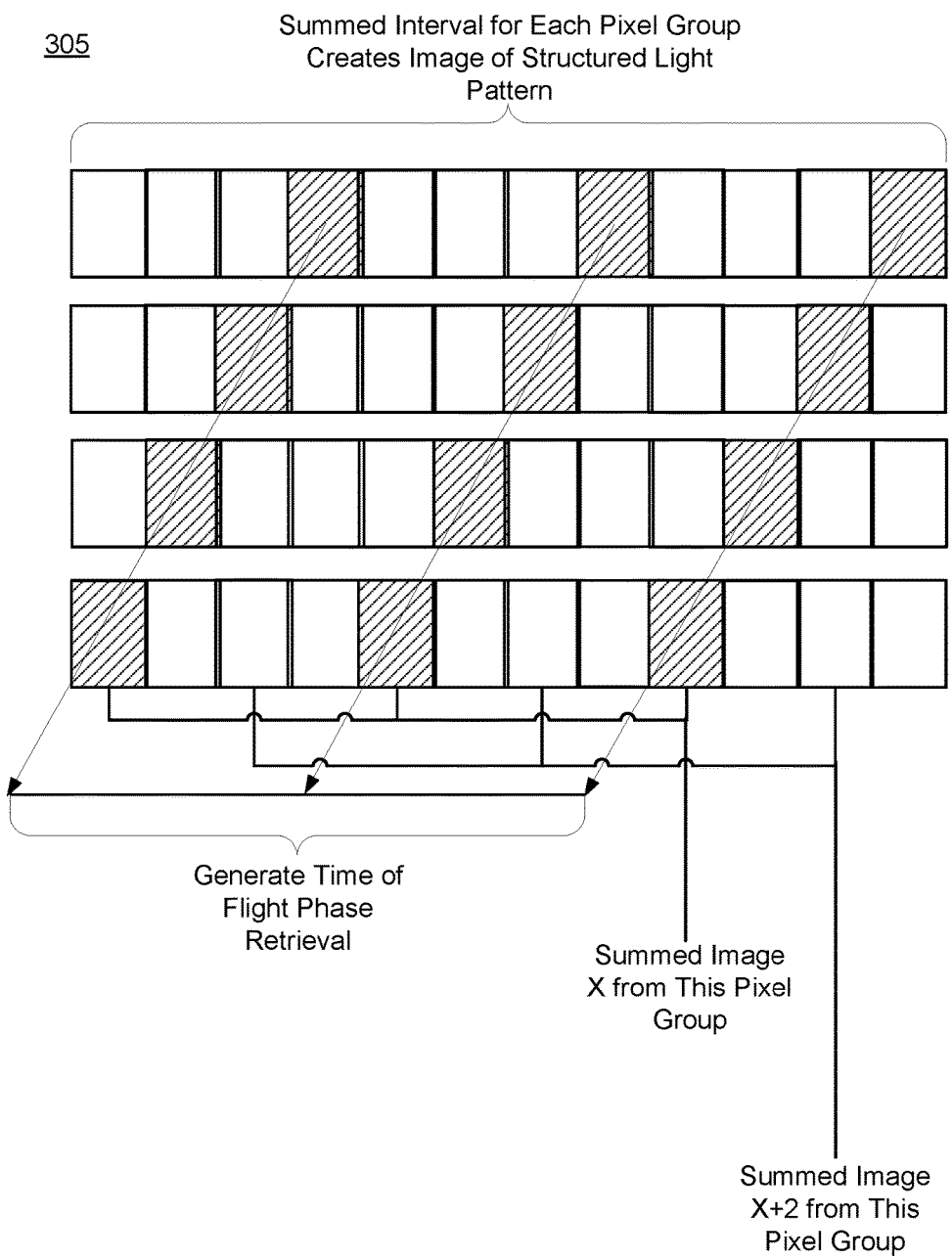
FIG. 3D is another example of a detector included in an imaging device of an eye tracking system included in the HMD in FIG. 1, in accordance with an embodiment

FIG. 3D shows another example of a detector 305 included in the imaging device 270. In the detector 300 described in conjunction with FIGS. 3A-3C, different pixel groups 310, 315, 320, 325 in the detector 300 are illustrated to capture light for fractions of an integration time for the imaging device 270 to generate a frame. In the example of FIG. 3D, each pixel group 310, 315, 320, 325 of the detector 305 includes multiple charge storage regions per each pixel, which may be implemented via software or hardware, such as a circulator or a switch. This allows each pixel group 310, 315, 320, 325 to continuously capture light during an integration time, and dynamically vary the location to which current generated from captured light is coupled based on frequency and phase timing of the carrier signal 330. Charge accumulated from light captured by different pixel groups 310, 315, 320, 325 is accumulated in different locations (e.g., memory or capacitors), providing different sub-windows, shown as highlighted rectangles in FIG. 3D. Sub-windows are combined along a diagonal to illustrate sub-windows having a certain phase shift relative to each other, e.g., the relative phase shift of 90 degrees as shown in FIG. 3D. Sub-windows from each pixel group 310, 315, 320, 325, are combined in phase to increase the signal-to-noise ratio and to generate a frame for a time-of-flight measurement. Hence, light captured by different pixel groups 310, 315, 320, 325 at different times is combined via the previously discussed method to extract the phase of the carrier signal 330. In the example of FIG. 3D, the highlighted sub-windows within a specified maximum integration time are combined, as each pixel group 310, 315, 320, 325 continuously captures light and varies locations where charge from the captured light is accumulated at a divisible phase of the carrier frequency. For example, each pixel group 310, 315,

320, 325 of the detector 305 of FIG. 3D simultaneously captures light and accumulates charge in a location corresponding to a pixel group 310, 315, 320, 325 capturing light, with the location in which charge accumulated by a pixel group 310, 315, 320, 325 changing based on the carrier signal 330 to preserve the phase of the carrier frequency. In some embodiments, each pixel group 310, 315, 320, 325 of the detector 305 shown in FIG. 3D is configured to capture light at up to a 100 percent duty cycle, allowing multiple pixel groups 310, 315, 320, 325 of the detector 305 to continuously and simultaneously accumulate charge from light captured by multiple pixel groups 310, 315, 320, 325. As further described above, a phase angle determined by different pixel groups 310, 315, 320, 325 allows correction of radiometric differences to analyze the structured light pattern. Additionally, in the example of FIG. 3D, continuous capture of light by different pixel groups 310, 315, 320, 325 allows passive correction for a structured light image analysis. By summing the full charge captured over the full integration window for each pixel group 310, 315, 320, 325, the detector 305 operates as an image capture device, such as a camera, as there appears to be no offset in the pixel level integration timing. Hence, the detector 305 shown in FIG. 3D reduces the potential for correlated fixed pattern, temporal, or systemic noise by minimizing the effect of temporal modulation on the structured light algorithm.

Figure 4:
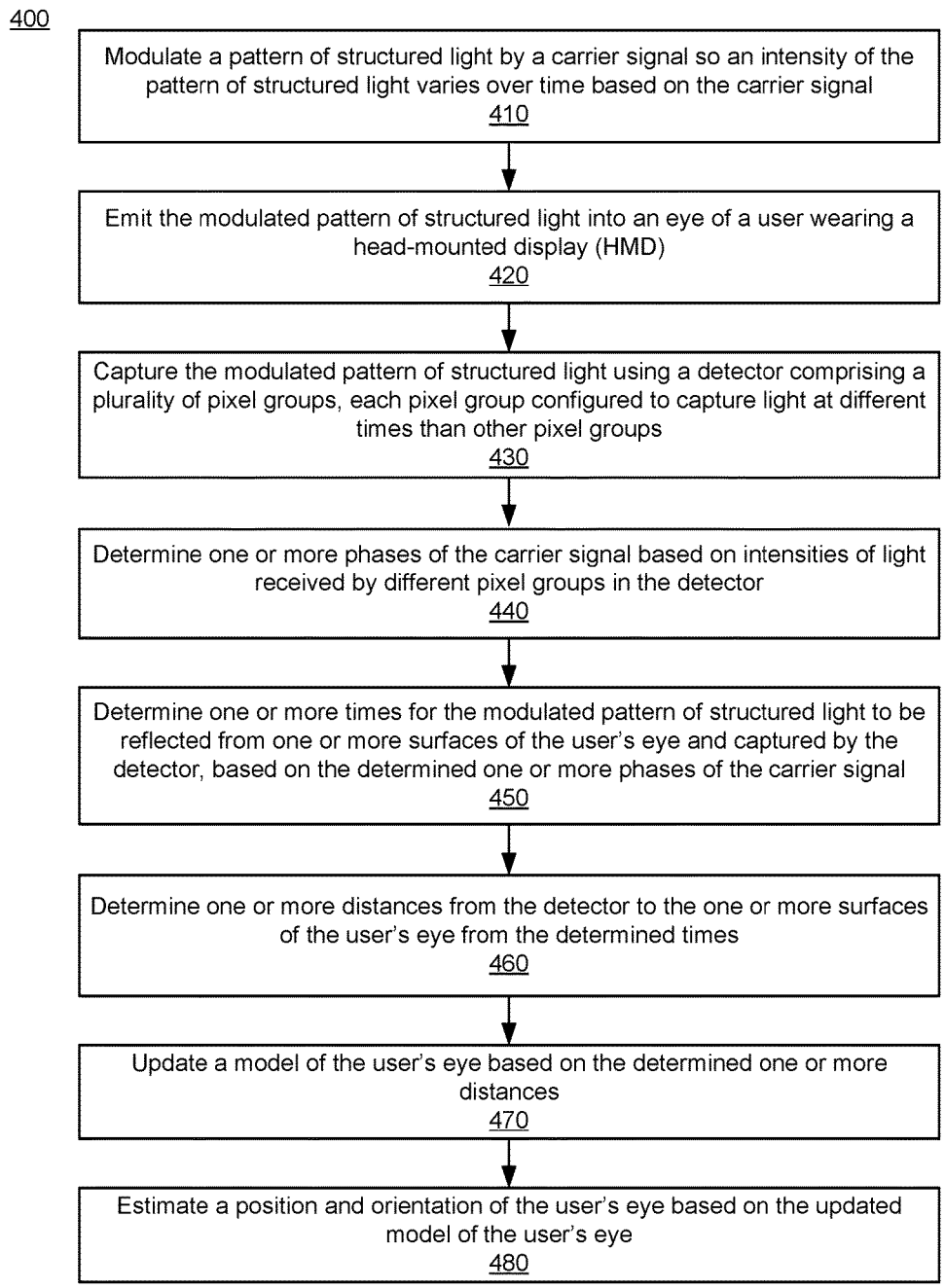
FIG. 4 is a flow chart illustrating a process of determining eye tracking information using structured light and time-of-flight, which may be implemented at the HMD shown in FIG. 1, in accordance with an embodiment.

FIG. 4 is a flow chart illustrating a process 400 of determining eye tracking information using structured light and time-of-flight, which may be implemented at the HMD 100 shown in FIG. 1, in accordance with an embodiment. The process 400 of FIG. 4 may be performed by the components of a HMD (e.g., the HMD 100). Other entities may perform some or all of the steps of the process in other embodiments. Likewise, embodiments may include different and/or additional steps, or perform the steps in different orders.

The HMD temporally modulates 410 (e.g., via a controller coupled to an illumination source of an eye tracking system) a pattern of structured light by a carrier signal so an intensity of the pattern of structured light varies over time based on the carrier signal. The carrier signal may comprise a sine wave or a square wave. In some embodiments, the illumination source comprises a light emitter that emits light in a defined range of wavelengths, e.g., the light emitter emits light in the IR having one or more wavelengths larger than 750 nm.

The HMD emits 420 (e.g., via the illumination source of the eye tracking system) the modulated pattern of structured light into an eye of a user wearing the HMD. In some embodiments, the modulated pattern of structured light illuminates one or more surfaces of the user's eye, e.g., cornea, sclera, pupil, etc. Furthermore, the modulated pattern of structured light may also illuminate surrounding surfaces of the user's eye including skin of an eye socket, eye lids, etc.

The HMD captures 430 the modulated pattern of structured light, e.g., using a detector of an imaging device of the eye tracking system. The detector comprises a plurality of pixel groups, wherein each pixel group is configured to capture light at different times than other pixel groups, i.e., light is captured using different pixel groups at different times. In some embodiments, light captured by a pixel group has a specific phase shift relative to light captured by other pixel groups adjacent to the pixel group. In some embodiments, the imaging device comprises a camera configured to capture images in the IR.

The HMD determines 440 (e.g., via a controller that may be coupled to the imaging device and the illumination source of the eye tracking system) one or more phases of the carrier signal based on intensities of light received by different pixel groups in the detector. In some embodiments, the HMD determines a difference between intensities of light captured by a pixel group in the detector and by another pixel group in the detector adjacent to the pixel group. The HMD further determines an additional difference between intensities of light captured by an alternative pixel group in the detector and a further pixel group in the detector adjacent to the alternative pixel group, the alternative pixel group and the further pixel group adjacent to the pixel group. The HMD determines the phase of the carrier signal based on a ratio of the difference to the additional difference.

The HMD determines 450 (e.g., via the controller) one or more times for the modulated pattern of structured light to be reflected from one or more surfaces of the user's eye and captured by the detector of the imaging device, based on the determined one or more phases of the carrier signal.

The HMD determines 460 (e.g., via the controller) one or more distances from the detector to the one or more surfaces of the user's eye from the determined times.

The HMD updates 470 (e.g., via the controller) a model of the user's eye based on the determined one or more distances. In some embodiments, the HMD determines three-dimensional coordinates of at least one of a cornea, a sclera and a pupil of the user's eye, based on the determined one or more distances. The HMD then updates 470 the model of the user's eye based on the determined three-dimensional coordinates. In some embodiments, the HMD generates an initial model of the eye or receives an initial model of the eye from, e.g., a console coupled to the HMD.

The HMD estimates 480 (e.g., via the controller) a position and orientation of the user's eye based on the updated model of the user's eye. In some embodiments, the HMD estimates position and orientation of both eyes of the user, based on models updated for both eyes. The various applications of the HMD based on the estimated position and orientation of the user's eye include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, the HMD performs (e.g., via a varifocal module coupled to the controller) foveated rendering of one or more images displayed on an electronic display of the HMD, based on the estimated position and orientation of the user's eye. In one or more embodiments, the varifocal module can use information about the position and orientation of the user's eye obtained from the controller to adjust where objects are displayed to prevent vergence-accommodation conflict.

System Environment

Figure 5:
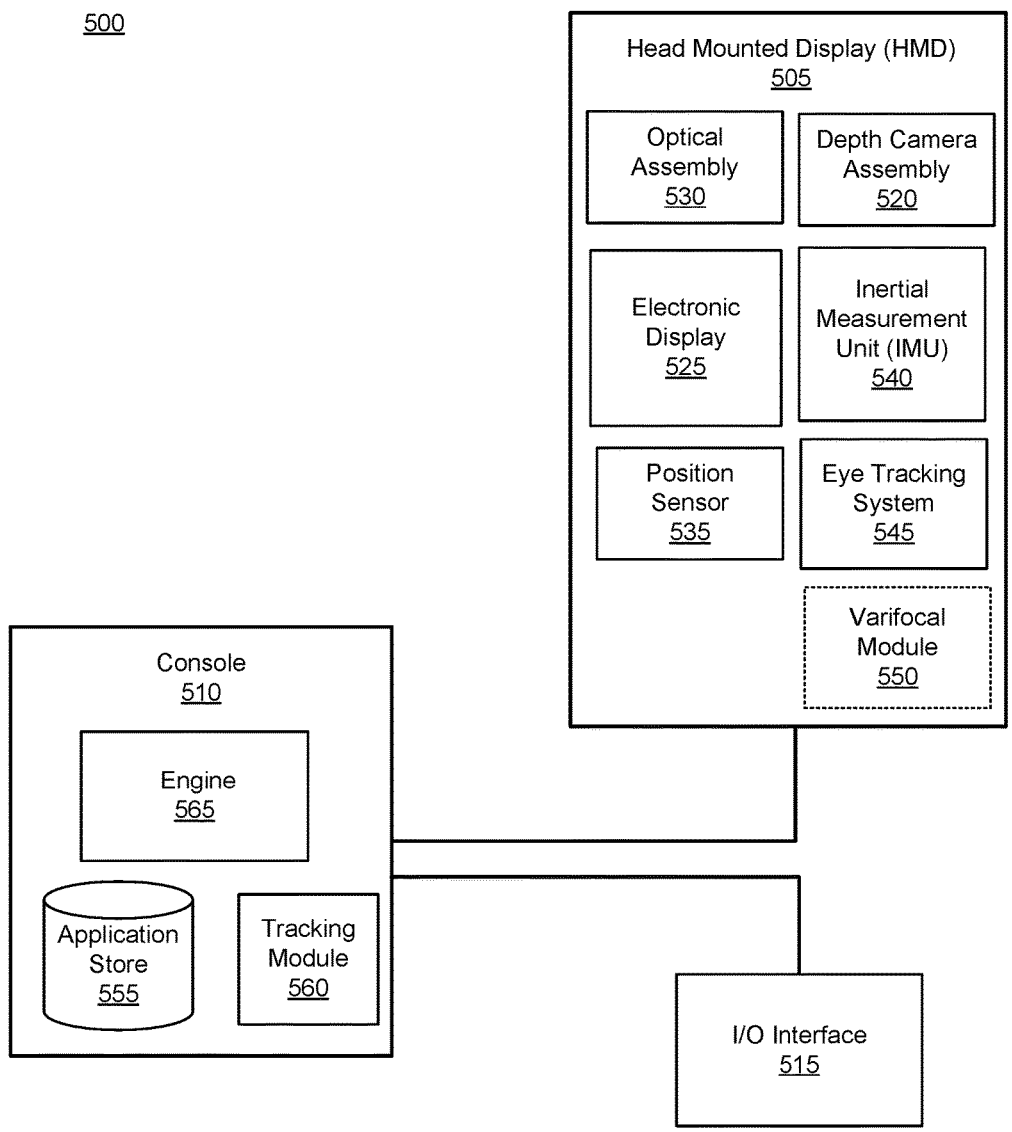
FIG. 5 is a block diagram of a system environment that includes the HMD shown in FIG. 1 with integrated eye tracking, in accordance with an embodiment.

FIG. 5 is a block diagram of one embodiment of a HMD system 500 in which a console 510 operates. The HMD system 500 may operate in a VR system environment, an AR system environment, a MR system environment, or some combination thereof. The HMD system 500 shown by FIG. 5 comprises a HMD 505 and an input/output (I/O) interface 515 that is coupled to the console 510. While FIG. 5 shows an example HMD system 500 including one HMD 505 and on I/O interface 515, in other embodiments any number of these components may be included in the HMD system 500.

For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or 3D images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 is the HMD 100 described above in conjunction with FIG. 1.

The HMD 505 includes a DCA 520, an electronic display 525, an optical assembly 530, one or more position sensors 535, an IMU 540, an eye tracking system 545 (e.g., for each eye of a user wearing the HMD 505), and an optional varifocal module 550. Some embodiments of the HMD 505 have different components than those described in conjunction with FIG. 5. Additionally, the functionality provided by various components described in conjunction with FIG. 5 may be differently distributed among the components of the HMD 505 in other embodiments.

The DCA 520 captures data describing depth information of an area surrounding the HMD 505. The data describing depth information may be associated with one or a combination of the following techniques used to determine depth information: structured light, time-of-flight, or some combination thereof. The DCA 520 can compute the depth information using the data, or the DCA 520 can send this information to another device such as the console 510 that can determine the depth information using data from the DCA 520.

The DCA 520 includes an illumination source, an imaging device, and a controller. The illumination source emits light onto an area surrounding the HMD. The illumination source includes a plurality of emitters on a single substrate. The imaging device captures ambient light and light from one or more emitters of the plurality of emitters that is reflected from objects in the area. The controller coordinates how the illumination source emits light and how the imaging device captures light. In some embodiments, the controller may also determine depth information associated with the local area using the captured images.

The illumination source of the DCA 520 includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic light emitting diodes (LEDs), a vertical-cavity surface-emitting laser (VCSEL), or some other source. In some embodiments, a single emitter or a plurality of emitters in the illumination source can emit light having a structured light pattern.

The electronic display 525 displays 2D or 3D images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 530 magnifies image light received from the electronic display 525, corrects optical errors associated with the image light, and presents the corrected image light to a user of the HMD 505. The optical assembly 530 includes a plurality of optical elements. Example optical elements included in the optical assembly 530 include an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field of view of the content presented by the electronic display 525. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content.

The IMU 540 is an electronic device that generates data indicating a position of the HMD 505 based on measurement signals received from one or more of the position sensors 535 and from depth information received from the DCA 520. A position sensor 535 generates one or more measurement signals in response to motion of the HMD 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the HMD 505 relative to an initial position of the HMD 505. For example, the position sensors 535 include multiple accelerometers to measure translational motion (forward/back, up/down, left/right) and multiple gyroscopes to measure rotational motion (e.g., pitch, yaw, roll). In some embodiments, the IMU 540 rapidly samples the measurement signals and calculates the estimated current position of the HMD 505 from the sampled data. For example, the IMU 540 integrates the measurement signals received from the accelerometers over time to estimate a velocity vector and integrates the velocity vector over time to determine an estimated current position of a reference point on the HMD 505. Alternatively, the IMU 540 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 540 receives one or more parameters from the console 510. The one or more parameters are used to maintain tracking of the HMD 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the HMD 505, the IMU 540 may be a dedicated hardware component. In other embodiments, the IMU 540 may be a software component implemented in one or more processors.

The eye tracking system 545 determines eye tracking information associated with an eye of a user wearing the HMD 505. The eye tracking information determined by the eye tracking system 545 may comprise information about a position and an orientation of the user's eye, i.e., information about an angle of an eye-gaze. The eye tracking system 545 comprising an illumination source, an imaging device and a controller is an embodiment of the eye-tracking system 260 described above in conjunction with FIG. 2, FIGS. 3A-3D and FIG. 4. The illumination source of the eye tracking system 545 is configured to illuminate the user's eye with a structured light pattern temporally modulated by a carrier signal. The imaging device of the eye tracking system 545 is configured to capture light reflected from at least one surface of the user's eye. The controller of the eye tracking system 545 determines the eye tracking information and tracks position/orientation of the user's eye using both structured light information and time-of-flight information.

In some embodiments, the varifocal module 550 is integrated into the HMD 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with the electronic display 525 and/or at least one optical element of the optical assembly 530. Then, the varifocal module 550 may be configured to adjust focus of the one or more images displayed on the electronic display 525 by adjusting position of the electronic display 525 and/or position of the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. The various additional applications of the varifocal module 550 based on the eye tracking information include, but are not limited to, providing user interfaces (e.g., gaze-based selection), attention estimation (e.g., for user safety), different gaze-contingent display modes (e.g., adaptive optical distortion correction, synthetic depth of field rendering), metric scaling for depth and parallax correction (e.g., IPD and eye-box adjustment), etc.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the DCA 520, the HMD 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 560 calibrates the HMD system 500 using one or more calibration parameters and may adjust one or more calibration parameters to reduce error in determination of the position of the HMD 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the HMD 505 and/or an IMU 540 included in the I/O interface 515. Additionally, if tracking of the HMD 505 is lost (e.g., the DCA 520 loses line of sight of at least a threshold number of structured light elements), the tracking module 560 may re-calibrate some or all of the HMD system 500.

The tracking module 560 tracks movements of the HMD 505 or of the I/O interface 515 using information from the DCA 520, the one or more position sensors 535, the IMU 540 or some combination thereof. For example, the tracking module 560 determines a position of a reference point of the HMD 505 in a mapping of a local area based on information from the HMD 505. The tracking module 560 may also determine positions of the reference point of the HMD 505 or a reference point of the I/O interface 515 using data indicating a position of the HMD 505 from the IMU 540 or using data indicating a position of the I/O interface 515 from an IMU 540 included in the I/O interface 515, respectively. Additionally, in some embodiments, the tracking module 560 may use portions of data indicating a position or the HMD 505 from the IMU 540 as well as representations of the local area from the DCA 520 to predict a future location of the HMD 505. The tracking module 560 provides the estimated or predicted future position of the HMD 505 or the I/O interface 515 to the engine 565.

The engine 565 generates a three-dimensional mapping of the area surrounding the HMD 505 (i.e., the "local area") based on information received from the HMD 505. In some embodiments, the engine 565 determines depth information for the three-dimensional mapping of the local area based on information received from the DCA 520 that is relevant for techniques used in computing depth. The engine 565 may calculate depth information using one or more techniques in computing depth (e.g., structured light, time-of-flight, or some combination thereof). In various embodiments, the engine 565 uses different types of information determined by the DCA 520 or a combination of types of information determined by the DCA 520.

The engine 565 also executes applications within the system environment 500 and receives position information, acceleration information, velocity information, predicted future positions, or some combination thereof, of the HMD 505 from the tracking module 560. Based on the received information, the engine 565 determines content to provide to the HMD 505 for presentation to the user. For example, if the received information indicates that the user has looked to the left, the engine 565 generates content for the HMD 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

The engine 565 can be configured to utilize, in association with the console 510 and the HMD 505, the eye tracking information obtained from the eye tracking system 545 for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking system 545, the engine 565 determines resolution of the content provided to the HMD 505 for presentation to the user on the electronic display 525. The engine 565 provides the content to the HMD 505 having a maximum pixel density (maximum resolution) on the electronic display 525 in a foveal region of the user's gaze, whereas the engine 565 provides a lower pixel resolution in other regions of the electronic display 525, thus achieving less power consumption at the HMD 505 and saving computing cycles of the console 510 without compromising a visual experience of the user. In some embodiments, the engine 565 can be configured to optimize the performance of viewing optics of the HMD 505 (e.g., components of the optical assembly 530), based on the eye tracking information obtained from the eye tracking system 545. In one embodiment, the engine 565 can adjust optical distortion correction parameters of the viewing optics, e.g., to prevent vergence-accommodation conflict. In an alternate embodiment, the engine 565 can adjust focus of images displayed on the electronic display 525, e.g., to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
an electronic display configured to emit image light;
an illumination source configured to:
   temporally modulate a structured light pattern with a carrier signal, the modulated structured light pattern having an intensity that varies over time based on the carrier signal, and
   illuminate a user's eye with the modulated structured light pattern;
an imaging device configured to capture the modulated structured light pattern, the imaging device including a detector comprising:
   a plurality of pixel groups each including one or more pixels, each pixel group configured to receive a control signal determining when a pixel group captures light, the control signal causing pixel groups to capture light at different times relative to other pixel groups;
a controller coupled to the imaging device, the controller configured to:
   determine one or more phases of the carrier signal based on intensities of light received by different pixel groups in the detector,
   determine one or more times for the modulated structured light pattern to be reflected from one or more surfaces of the user's eye and captured by the detector based on the determined one or more phases of the carrier signal,
   determine one or more distances from the detector to the one or more surfaces of the user's eye from the determined one or more times,
   update a model of the user's eye based on the determined one or more distances, and
   estimate a position and orientation of the user's eye based on the updated model of the user's eye, wherein the image light emitted from the electronic display is rendered based in part on the estimated position and orientation of the user's eye; and
an optical assembly configured to direct the image light to an exit pupil of the HMD corresponding to a location of the user's eye.

2. The HMD of claim 1, wherein a pixel group is configured to capture light when the control signal received by the pixel group has a value and to not capture light when the control signal received by the pixel group has an alternative value.

3. The HMD of claim 2, wherein control signals received by different pixel groups have the value at different times.

4. The HMD of claim 2, wherein control signals received by adjacent pixel groups at the different times cause light captured by the pixel group to have a specific phase shift relative to light captured by other pixel groups adjacent to the pixel group.

5. The HMD of claim 4, wherein the specific phase shift is selected from a group consisting of a 60-degree phase shift, a 90-degree phase shift, and a 180-degree phase shift.

6. The HMD of claim 1, wherein the controller is further configured to:
determine a difference between intensities of light captured by a pixel group and by another pixel group adjacent to the pixel group;
determine an additional difference between intensities of light captured by an alternative pixel group and a further pixel group adjacent to the alternative pixel group, the alternative pixel group and the further pixel group adjacent to the pixel group; and
determine the phase of the carrier signal based on a ratio of the difference to the additional difference.

7. The HMD of claim 6, wherein the controller is further configured to:
determine the phase of the carrier signal as an arctangent of the difference to the additional difference.

8. The HMD of claim 1, wherein the plurality of pixel groups included in the detector are arranged in a repeating pattern.

9. The HMD of claim 8, wherein the repeating pattern comprises a 2 by 2 grid, where each pixel group in the 2 by 2 grid captures light that has a 90-degree phase shift relative to light captured by another pixel group in the 2 by 2 grid.

10. The HMD of claim 1, wherein the carrier signal comprises a sine wave or a square wave.

11. The HMD of claim 1, wherein each pixel group simultaneously captures light and a charge accumulated in a storage region included in a pixel group is changed based on the carrier signal.

12. The HMD of claim 1, wherein each pixel group is configured to capture light at up to a 100 percent duty cycle.

13. The HMD of claim 1, wherein:
each pixel group includes multiple charge storage regions; and
the detector is configured to accumulate charge from light captured by a pixel group in one of the charge storage regions included in the pixel group based at least in part on a phase of the carrier signal.

14. The HMD of claim 1, wherein the controller is further configured to:
determine three-dimensional coordinates of at least one of a cornea, a sclera and a pupil of the user's eye, based on the determined one or more distances; and
update the model of the user's eye based on the determined three-dimensional coordinates.

15. The HMD of claim 1, further comprising:
a varifocal module configured to adjust presentation of one or more images displayed on the electronic display, based on the estimated position and orientation of the user's eye.

16. The HMD of claim 1, wherein:
the light emitter emits light in infrared (IR); and
the imaging device comprises a camera configured to capture images in the IR.

17. The HMD of claim 1, wherein the illumination source and the imaging device are positioned outside of a primary display optical path of the user's eye.

18. A method comprising:
temporally modulating a pattern of structured light by a carrier signal so an intensity of the pattern of structured light varies over time based on the carrier signal;
emitting the modulated pattern of structured light into a user's eye;
capturing the modulated pattern of structured light using a detector comprising a plurality of pixel groups, each pixel group configured to capture light at different times than other pixel groups;
determining one or more phases of the carrier signal based on intensities of light received by different pixel groups in the detector;
determining one or more times for the modulated pattern of structured light to be reflected from one or more surfaces of the user's eye and captured by the detector based on the determined one or more phases of the carrier signal;
determining one or more distances from the detector to the one or more surfaces of the user's eye from the determined times;
updating a model of the user's eye based on the determined one or more distances; and
estimating a position and orientation of the user's eye based on the updated model of the user's eye.

19. The method of claim 18, wherein capturing the modulated pattern of structured light using the detector comprises:
capturing light using different pixel groups at different times.

20. The method of claim 19, wherein capturing light using different pixel groups at different times comprises:
capturing light using different pixel groups so light captured by a pixel group has a specific phase shift relative to light captured by other pixel groups adjacent to the pixel group.

21. The method of claim 18, wherein determining the phase of the carrier signal based on intensities of light received by different pixel groups in the detector comprises:
determining a difference between intensities of light captured by a pixel group in the detector and by another pixel group in the detector adjacent to the pixel group;
determining an additional difference between intensities of light captured by an alternative pixel group in the detector and a further pixel group in the detector adjacent to the alternative pixel group, the alternative pixel group and the further pixel group adjacent to the pixel group; and
determining the phase of the carrier signal based on a ratio of the difference to the additional difference.

22. The method of claim 18, further comprising:
determining three-dimensional coordinates of at least one of a cornea, a sclera and a pupil of the user's eye, based on the determined distances; and
updating the model of the user's eye based on the determined three-dimensional coordinates.

* * * * *

UNITED STATES PATENT AND TRADEMARK OFFICE
CERTIFICATE OF CORRECTION

PATENT NO. : 10,025,384 B1
APPLICATION NO. : 15/400256
DATED : July 17, 2018
INVENTOR(S) : Nicholas Daniel Trail Page 1 of 1

It is certified that error appears in the above-identified patent and that said Letters Patent is hereby corrected as shown below:

In the Claims

Column 21, Line 7, Claim 16, delete "the light emitter" and insert -- the illumination source comprises a light emitter that --.

Signed and Sealed this
Fifth Day of March, 2019

Andrei Iancu
*Director of the United States Patent and Trademark Office*